United States Patent
Injeyan et al.

[11] Patent Number: 5,991,315
[45] Date of Patent: Nov. 23, 1999

[54] OPTICALLY CONTROLLABLE COOLED SATURABLE ABSORBER Q-SWITCH SLAB

[75] Inventors: Hagop Injeyan, Glendale; Stephen P. Palese, Torrance, both of Calif.

[73] Assignee: TRW Inc., Redondo Beach, Calif.

[21] Appl. No.: 09/146,892

[22] Filed: Sep. 3, 1998

[51] Int. Cl.⁶ .................................................. H01S 3/113
[52] U.S. Cl. ............................ 372/11; 372/34; 372/66; 372/69; 372/39; 372/71
[58] Field of Search ................................ 372/11, 34, 69, 372/71, 66, 39

[56] References Cited

U.S. PATENT DOCUMENTS

| | | | |
|---|---|---|---|
| 3,451,010 | 6/1969 | Maiman | 372/66 |
| 4,191,931 | 3/1980 | Kuppenheimer | 372/10 |
| 4,734,911 | 3/1988 | Bruesselbqach | 372/21 |
| 5,119,382 | 6/1992 | Kennedy et al. | 372/11 |
| 5,299,220 | 3/1994 | Brown et al. | 372/71 |
| 5,307,430 | 4/1994 | Beach et al. | 372/101 |
| 5,394,420 | 2/1995 | Senn et al. | 372/39 |
| 5,408,480 | 4/1995 | Hemmati | 372/11 |
| 5,441,803 | 8/1995 | Meissner | 428/220 |
| 5,548,606 | 8/1996 | Senn et al. | 376/66 |
| 5,555,254 | 9/1996 | Injeyan et al. | 372/66 |
| 5,608,742 | 3/1997 | Petersen | 372/27 |
| 5,646,773 | 7/1997 | Injeyan et al. | 359/337 |

Primary Examiner—Leon Scott, Jr.
Attorney, Agent, or Firm—Michael S. Yatsko

[57] ABSTRACT

A solid state saturable absorber (SSSA) is formed from a slab of solid state material, such as $Cr^{4+}$: YAG. Optical distortion caused by the absorption process can be minimized by confining absorption to portions of the solid state slab which can be cooled efficiently. In accordance with an important aspect of the invention, the use of the SSSA in accordance with the present invention allows the repetition rate, pulse width, and energy level of the laser output pulses to be controlled by way of optical pump sources, such as a diode array. The solid state slab material allows for zig-zag propagation and thus, averaging of the thermal gradients caused by absorption, optical pumping and cooling which results in relatively low thermal lensing with virtually no birefringence and therefore allows for passive Q-switching applications in relatively high brightness laser systems. In an alternate embodiment of the invention, a plurality of thin cells are stacked and immersed in an indexed matched cooling fluid in order to increase the absorption length while minimizing optical distortion.

31 Claims, 3 Drawing Sheets

OPTICALLY CONTROLLABLE COOLED SATURABLE ABSORBER Q-SWITCH SLAB

BACKGROUND OF THE INVENTION

1. Field of the Invention

The present invention relates to a passive Q-switch device for use with a laser system and more particularly to a solid state saturable absorber which can be scaled to handle high brightness laser sources in which the repetition rate, pulse width and energy is optically controlled.

2. Description of the Prior Art

Q-switches and saturable absorbers are generally known to be used with various types of laser systems. Such devices are known to be disposed within the laser cavity and are used to block the primary laser signal until a relatively high population inversion has occurred in the lasing medium of the power amplifier at which time the device allows oscillation within the laser cavity to generate a relatively short pulse width high average power laser pulse. Examples of such laser systems which utilizes Q-switches are disclosed in: "SINGLE MODE HIGH PEAK POWER PASSIVELY Q-SWITCHED DIODE PUMP Nd: YAG LASER by Afzal, et al., *Optics Letters*, vol. 22, No. 17, Sep. 1, 1997 pp. 1314–1316 "Cr Li SAF Thin Slab Zig-Zag Laser" by Mandl, et al. *IEEE Journal of Quantum Electronics* vol. 33 No. Oct. 10, 1997, pp. 1864–1868, and U.S. Pat. Nos. 4,191,931; 5,119,382; 5,408,480 all hereby incorporated by reference. Active Q-switches are known to be either electro-optically or acousto-optically switched in order to obtain relatively high peak power average power pulses. Electro-optical Q-switches are known to include a non-linear crystal, such as $LiNbO_3$, BBO or KDP. In such electro-optically controlled Q-switches, a kilovolt level electrical pulse is directed to the non-linear crystal, which causes the crystal to become birefringent to create a high cavity loss in order to prevent oscillation of the primary laser signal until an optimal population inversion occurs in the lasing medium. Such electro-optical Q-switches require a relatively fast rising electrical pulse in the nanosecond range and can consume a relatively significant amount of electrical power.

Acousto-optical Q-switches are also known. Such acousto-optical Q-switches are known to utilize a crystalline material, such as quartz or $TeO_2$. In such acousto-optical Q-switches, a high power radio frequency source is required to produce an RF acoustic wave which allows light to be diffracted out of the laser cavity.

In order to increase the reliability of lasers and eliminate the drawbacks of high power consumption and the need for a high frequency RF source, passive Q-switches have been developed. Such passive Q-switches are known as saturable absorbers. Various saturable absorbers are known which utilize a light absorbing material that saturates when the gain inside the cavity exceeds a certain level at which time the primary laser signal is allowed to oscillate within the laser cavity. Known saturable absorbers are known to have several drawbacks including amplitude fluctuation of the output pulses as well as lack of precise frequency control. Also, residual absorption leads to heating. Thus, there is a need for a controllable saturable absorber for use with laser systems.

SUMMARY OF THE INVENTION

Briefly, the present invention relates to a solid state saturable absorber (SSSA). The SSSA is formed from a slab of solid state material, such as $Cr^{4+}$: YAG. Optical distortion caused by the absorption process can be minimized by confining absorption to portions of the solid state slab which can be cooled efficiently. In accordance with an important aspect of the invention, the SSSA in accordance with the present invention allows the repetition rate, pulse width, and energy level of the laser output pulses to be controlled by way of an optical pump source, such as a diode array. In several embodiments of the invention, the solid state material is configured for zig-zag propagation of a light beam therethrough which averages the thermal gradients caused by the optical pumping and cooling which results in relatively low thermal lensing with virtually no birefringence and therefore allows for Q-switching applications in relatively high brightness laser systems. In an alternate embodiment of the invention, thin slabs of a solid state material immersed in an index matched coolant are used to maximize the absorption length while minimizing the optical distortion.

DESCRIPTION OF THE DRAWINGS

These and other advantages of the present invention will be readily understood with reference to the following specification and attached drawing wherein.

DETAILED DESCRIPTION

Figure 1:
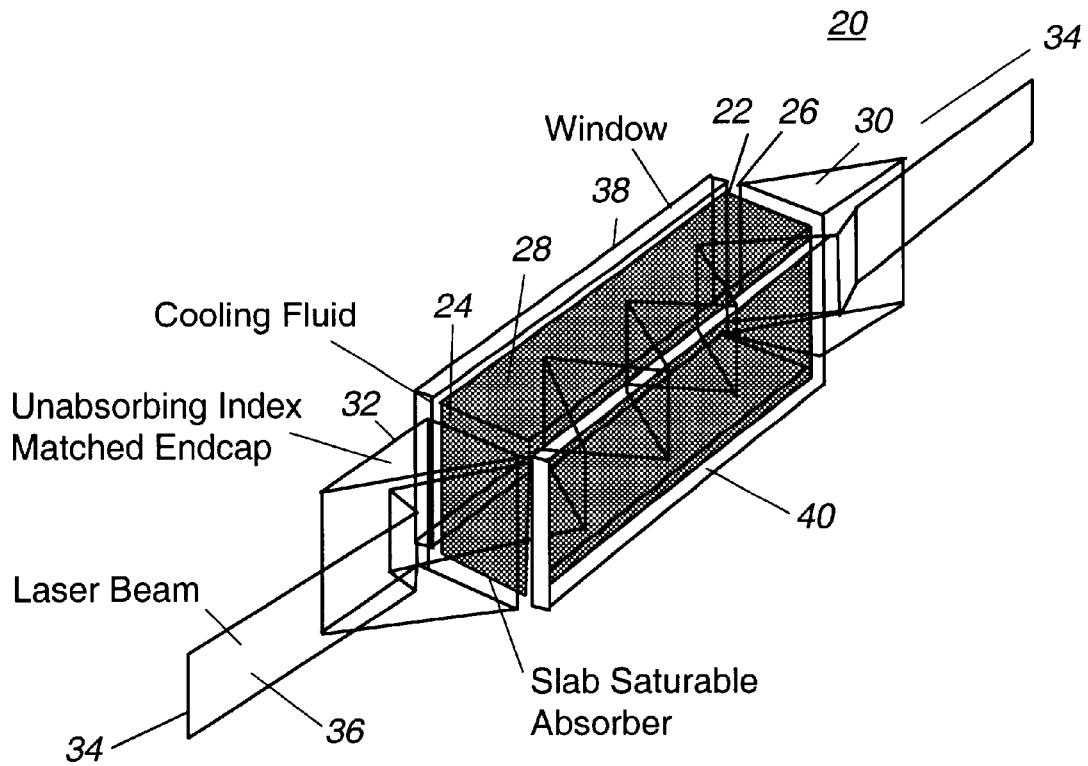
FIG. 1 is a perspective view of a solid state saturable absorber in accordance with one embodiment of the invention.
Figure 2:
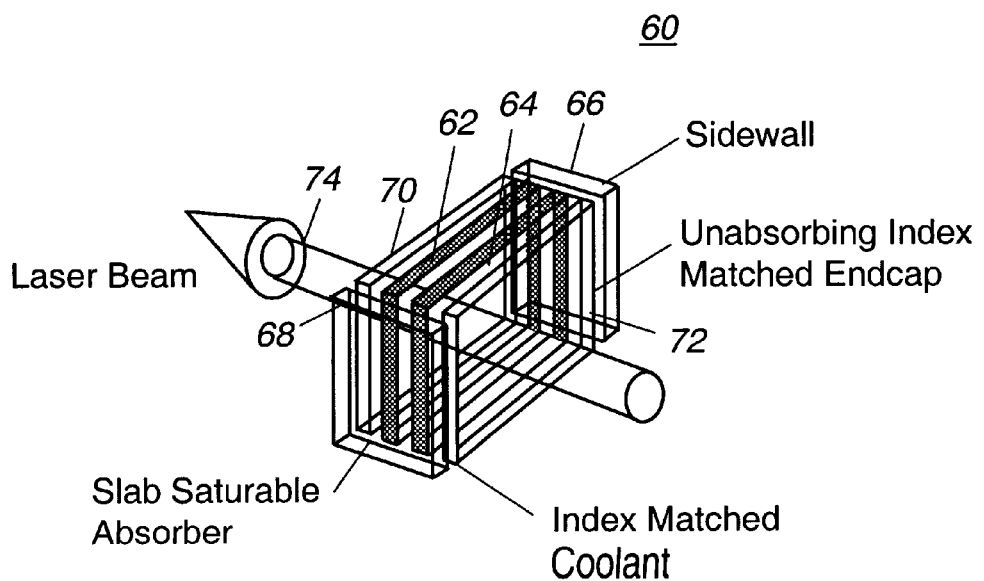
FIG. 2 is a perspective view of an alternate embodiment of the solid state saturable absorber in accordance with the present invention.
Figure 3A:
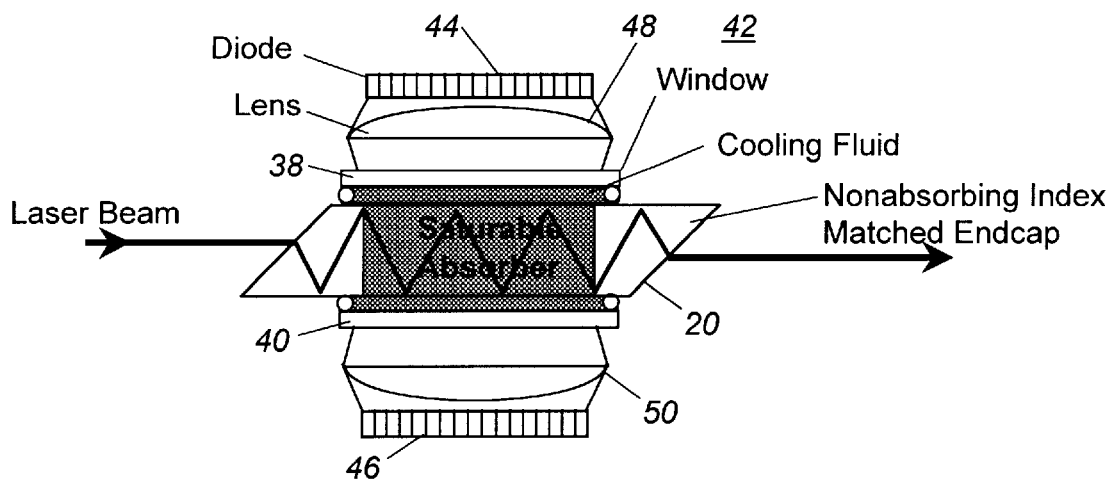
FIGS. 3a and 3b illustrate a schematic diagram for an optically controlled solid state saturable absorber in accordance with the present invention illustrating a side pumped version and an end pumped respectively.
Figure 3B:
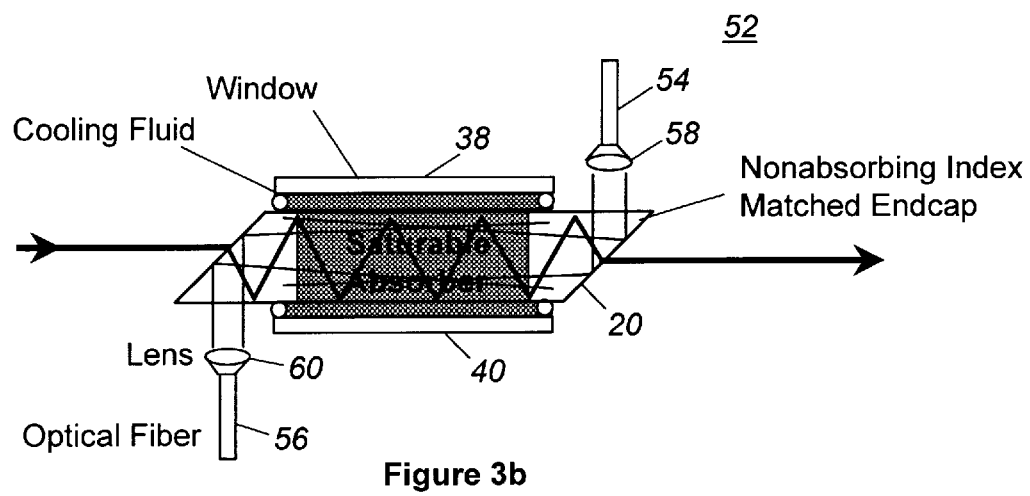
Figure 4:
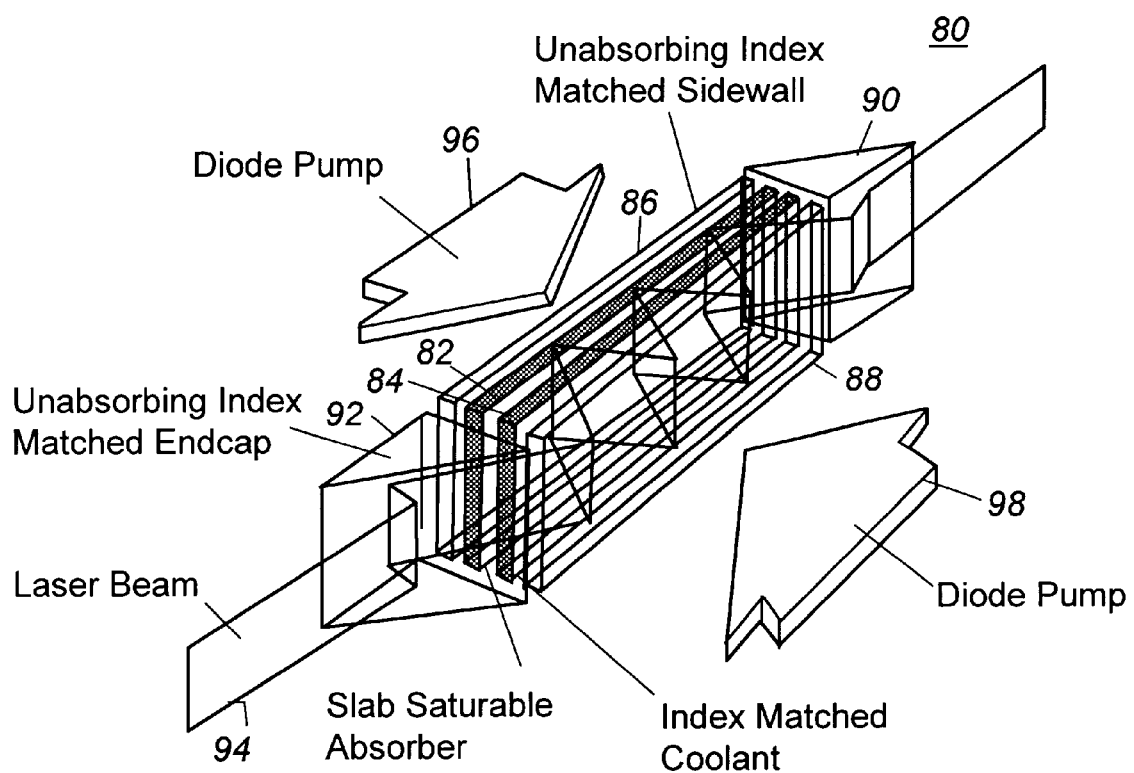
FIG. 4 is a schematic diagram of a thin slab solid state saturable absorber in accordance with another embodiment of the present invention.

The present invention relates to a solid state saturable absorber that is adapted to be utilized as a passive Q-switch for a laser system. As will be discussed in more detail below, the SSSA is adapted to be disposed within a laser cavity (not shown) to absorb a primary laser signal, for example, from a master oscillator, until an optimal population inversion has occurred in order to generate a relatively high peak power, short width output pulse. In accordance with an important aspect of the invention, the SSSA is formed from a solid state material and is configured to provide a zig-zag propagation pattern therethrough thereby providing averaging of the thermal gradients, similar to known zig-zag amplifiers. This feature enables the SSSA to be utilized in relatively high brightness laser applications. In accordance with another important aspect of the present invention, the absorber opacity or optical transparency is controlled optically, for example, by way of a relatively low power pumping source, such as a diode array, in order to control the repetition rate, pulse energy and pulse width of the laser output pulse. Two basic embodiments of the invention are illustrated. FIGS. 1, 3A and 3B illustrate one general embodiment which use an elongated slab of solid state material. In particular, FIG. 1 illustrates a solid state saturable absorber cell in accordance with one embodiment of the invention. FIGS. 3A and 3B represent optical schematic diagrams of a solid state saturable absorber utilizing the cell illustrated in FIG. 1 in end-pumped and side pumped configurations, respectively. FIGS. 2 and 4 illustrate alternate embodiments of the invention in which a plurality of thin cells, for example, having a thickness of 1–2 mm, are used for the solid state saturable absorber cell. FIG. 4 represents an optical schematic of a solid state saturable absorber incorporating the thin cells illustrated in FIG. 2.

Referring to FIG. 1, a solid state saturable absorber cell in accordance with one embodiment of the invention is illustrated and generally identified with the reference numeral 20. The SSSA cell 20 is formed from an elongated slab of a solid state material 22, such as $Cr^{4+}$ doped yttrium-aluminum-garnet ($Cr^{4+}$:YAG). The elongated slab 22 may be formed in any shape which promotes zig-zagging, for example, a generally rectangular cross-section defining a pair of opposing end faces 24 and 26, four lateral faces, generally identified with the reference numeral 28, and internal sidewalls. The SSSA 20 in accordance with the present invention includes a pair of opposing end caps 30 and 32, cut at an angle so that the angle of the incident beam on the sidewalls of slab 22 is generally greater than the critical angle of incidence for total internal reflection.

In order to confine absorption to the area that can be cooled most efficiently (i.e. length of the slab 28), the opposing end caps 30 and 32 can be formed from an unabsorbing indexed matched material such as an undoped host material, such as yttrium-aluminum-garnet (YAG). These endcaps 30 and 32 are rigidly attached to the end faces 26 and 24, respectively, of the slab 28 by various techniques including diffusion bonding, for example, as described in detail in U.S. Pat. No. 5,441,803, hereby incorporated by reference, forming a composite slab 20.

In order to reduce the heat within the slab 22, cooling channels for example, as disclosed in commonly owned U.S. Pat. No. 5,646,773, hereby incorporated by reference, may be used for cooling the slab 22. The cooling channels 32 are formed adjacent to two of the opposing lateral faces 28 and may be formed by way of a pair opposing windows 38 and 40, disposed parallel to the opposing lateral endfaces 28. The windows 38 and 40 may be formed from various materials including sapphire. A cooling fluid is directed along the cooling channel, generally parallel to the longitudinal axis 34 as disclosed in commonly owned U.S. Pat. No. 5,646,773. The volumetric flow rate and temperature of the fluid in the cooling channels can be adjusted to vary the surface temperature of the lateral faces 28.

Two embodiments of a solid state saturable absorber utilizing the cell 20 are illustrated in FIGS. 3A and 3B. FIG. 3A illustrates an embodiment utilizing a side pumped pump source while FIG. 3B illustrates an embodiment utilizing an end pumped pump source.

Turning first to FIG. 3A, an SSSA, generally identified with the reference numeral 42, includes a solid state saturable absorber slab 20 as generally illustrated in FIG. 1. In this embodiment, a pump source is directed to the side of the absorption region of the slab 22 (i.e. adjacent the windows 38 and 40). Various types of pump sources may be used. For example, a pair of diode arrays 44 and 46 may be disposed adjacent the windows 38 and 40. Various diode arrays are suitable for use with the present invention. Examples of suitable diode arrays are disclosed in U.S. Pat. Nos. 4,852,109; 4,949,346; 4,984,246; 5,271,031; 5,305,345; 5,317,585; 5,351,251 and commonly owned co-pending patent application Ser. No. 08/766,434, filed on Dec. 12, 1996, hereby incorporated by reference. A set of lenses 48 and 50 may be disposed between the diode arrays 44 and 46 and the windows 38 and 40, respectively to collimate and focus the light beams from the diode arrays 44 and 46 to the desired volume on the slab 22. The lenses 48 and 50 may be simple cylindrical or aspheric lenses, lens ducts, diffractive lens arrays or optical fibers.

In an alternate embodiment as illustrated in FIG. 3B, a solid state saturable absorber, generally identified with the reference numeral 52, is illustrated which includes a saturable absorber cell 20 including the cooling channels as illustrated in FIG. 1. In this embodiment, the SSSA cell 20 is end pumped by directing a pair of oppositely disposed pumping sources 54 and 56 adjacent the opposing end caps 30 and 32 such that the pumped light is directed generally perpendicular to the longitudinal axis 34 of the device. In this embodiment, a suitable pump light source, such as diode arrays may be connected to a pair of optical fibers or fiber bundles, as shown, in order to direct the light beam from the pump source at an angle generally perpendicular to the longitudinal axis 34 of the device. A set of lenses 58 and 60 may be disposed between the light sources 54 and 56 and the endcaps 30 and 32 to collimate and focus the light from the light sources. The lenses 58 and 60 may also be cylindrical or aspheric lenses, lens ducts, diffractive lens arrays or optical fibers.

In accordance with another embodiment of the invention, the SSSA 20 may be integrated with a solid state amplifier for example as disclosed in commonly owned co-pending patent application Ser. No. 09/111080 entitled "End Pumped Zig-Zag Slab Laser Gain Medium" by H. Injeyan and C. Hoefer, filed on Jul. 7, 1998. In this embodiment, a composite slab may be formed in which one portion of the slab is formed as a solid state saturable absorber and another portion of the slab is formed as a solid state zig-zag amplifier. In this embodiment, the amplifier or gain portion can be formed from Nd:YAG or Nd:$YVO_4$ while the SSSA portion is formed from $Cr^{4+}$: YAG. The end caps may be fabricated from an undoped YAG. Suitable cooling sources and pump sources may be incorporated as discussed above.

It is known that optical distortion results from the absorption process. In order to minimize optical distortion, alternate embodiments are illustrated in FIGS. 2 and 4. This embodiment includes a plurality of thin slabs of a solid state material as discussed above. More particularly, referring to FIG. 2, an alternate solid state absorption cell, generally identified with the reference numeral 60, includes a plurality of generally rectangular thin slabs of a solid state absorption material immersed in a flowing index matched cooling fluid. As shown in FIG. 2, two generally rectangular slabs 62 and 64 are disposed parallel to one another an spaced apart as shown. Each of the slabs may be formed from an absorption type material, such as $Cr^{4+}$:YAG. In this embodiment, a pair of opposing sidewalls 66 and 68 is disposed generally perpendicular to the plane of the slabs 62 and 64 as shown. The pair of sidewalls 66 and 68 are disposed apart from the ends of the absorptive slab 62 and 64 to form a cooling channel to enable an indexed matched cooling fluid to flow between the ends of the slabs 62 and 64 and the sidewalls 66 and 68. In this embodiment, an unabsorbing pair of indexed matched end caps 70 and 72 may be disposed such that the slab 62 and 64 are sandwiched therebetween. The end caps 70 and 72 may be formed with a generally rectangular shape, the same shape as the absorptive slabs 62 and 64. The sidewall 66 and 68 as well as the end caps 70 and 72 may be formed from an undoped YAG material.

In this embodiment, a laser beam, illustrated with the reference numeral 74 (FIG. 2), flows in a direction generally perpendicular to the plane of the end caps 70 and 72 and the absorptive slabs 62 and 64. As illustrated in FIG. 2, the laser beam 74 is directed straight through the stack of the device 60 unlike the embodiment illustrated in FIG. 1 in which the laser beam follows a generally zig-zag pattern through the slab. In this embodiment, the thickness of the absorber portion is decreased, thereby decreasing the temperature gradient in the slabs, which minimizes optical distortion of the absorber.

In both the embodiments illustrated in FIGS. 1 and 2, absorption induced thermal distortion is minimized. The thermal distortion is reduced by spreading the heat to regions which can be effectively cooled. To further confine the absorption to the cool regions of the absorbers, sections of unabsorbing indexed matched material can be diffusion bonded to the end caps or sidewalls of the slab or thin slab cells. The thickness and number of absorber elements including channels can be altered depending on the application.

Increased power handling capabilities can be obtained by combining the zig-zag slab architectures illustrated in FIG. 1 with the thin cell architecture illustrated in FIG. 2 to form a thin zig-zag slab cell, generally identified with the reference numeral 80, as generally illustrated in FIG. 4. In this embodiment, a plurality of rectangular thin cell slabs 82 and 84 are disposed parallel to one another and spaced apart as generally shown forming a stack. Similar to FIG. 2, then the cells 82 and 84 are disposed between a pair of opposing sidewalls 86 and 88. The opposing sidewalls 86 and 88 may be formed from an inabsorbing indexed matched material as discussed above. Opposing end caps 90 and 92 may be disposed adjacent opposing end portions of the absorptive slabs 82 and 84 and sidewalls 86 and 88. The opposing end caps 90 and 92 are formed with an angled surface to allow for total internal reflection of a laser beam 94 within the device as shown to allow propagation through the device in a generally zig-zag pattern as shown. Similar to the embodiment illustrated in FIG. 2 cooling channels may be disposed between the ends of the stack and the opposing end caps 90 and 92 and cooled with an index matched coolant, such as manufactured by Cargille Laboratories, Inc. of Cedar Grove, N.J. Various types pump sources, 96 and 98 may be disposed adjacent the opposing sidewalls 86 and 88. As discussed above, the pump sources may be formed from diode arrays and be configured for side pumping as illustrated. However, it is contemplated other pump sources can be used in configurations in which the device 80 is end pumped as discussed above.

As is noted in the art, pumping of the device results in increased temperature of the device in the area where the pump light is absorbed. In order to improve the cooling efficiency of the device, both conduction and convection cooling systems may be used for the embodiments discussed above. A convection type cooling system is as discussed above with the cooling channel.

In convection type cooling system, as described above and described in detail in commonly owned U.S. Pat. No. 5,646,773, the slab may be sealed in the dead zones with a thin layer of turbulent coolant flowing over the slab faces to remove heat as discussed in detail in commonly owned U.S. Pat. No. 5,646,773, hereby incorporated by reference. In the case of conduction or convention cooling, the lateral faces of the slab may be covered with a dielectric material which serves as an evanescent wave coating, for example >2 $\mu$m of $M_gF_2$ or $SiO_2$ to preserve total internal reflection. Conduction cooling systems may also be used. In applications where conduction cooling is utilized, a solid state cooler is placed in direct contact with the slab surfaces. An example of a suitable conduction cooling system is to attach the slab to a high intensity impingement cooler, for example, as manufactured by Thermo-Electron, San Diego, Calif. or SDL, Inc. in San Jose, Calif.

In order to minimize the thermal resistance between the cooling system and the slab, a thin layer of a thermally conductive material, such as a malleable metal, such as indium or gold or a thermally conducting grease or epoxy, may be disposed between the slab and the conduction cooler or a thin static layer of a liquid or gas. In this embodiment, during assembly the cooler/indium/slab assembly may be held under pressure at elevated temperatures, approximately 150° C., to flow the indium or other malleable metal to eliminate contact resistance.

In accordance with an important aspect of the invention, control of the laser characteristics, such as repetition rate, pulse energy and pulse width by pumping the solid state saturable absorber with a pump light source, for example, from an external diode source. This pump source can utilize either a butt coupling, an image relay, fiber or lens duct coupling of the diodes through the ends or sides of the device. The pump source can either be continuous or pulsed. Increasing the optical pump levels of the device effectively decreases the residual absorption of the material producing a saturable absorber with an optically controllable absorption. In the past, such control has been accomplished using individual optical plates with varied absorption levels. The present invention is advantageous since it allows continuous control of the optical transparency levels of the device and allows it to be done remotely without replacing optical elements in the laser.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A solid state saturable absorbe cornpnsing:
    an elongated slab of a solid state material having a generally rectangular cross-section, defining opposing end faces and a plurality of lateral faces;
    a pair of end caps disposed adjacent said opposing end faces, said end caps having an angled surface such that light beams directed at said angled surface are internally reflected in the slab in a generally zig-zag pattern; and
    means for cooling said elongated slab to thereby reduce the heat within the slab.

2. The solid state absorber as recited in claim 1, further including means for optically pumping said slab to control the optical transparency of the slab.

3. The solid state saturable absorber as recited in claim 2, wherein said pumping means includes side pumping mcans for pumping the lateral surfaces of said slab.

4. The solid state saturable absorber as recited in claim 3, wherein said side pumping means includes a diode array.

5. The solid state saturable absorber as recited in claim 1, wherein said slab is formed from $C_R^{4+}$:YAG.

6. The solid state saturable absorber as recited in claim 1, wherein said end caps are rigidly secured to said opposing end faces.

7. The solid state saturable absorber as recited in claim 6, wherein said end caps are diffusion bonded to said opposing end faces.

8. The solid state saturable absorber as recited in claim 1, wherein said end caps are made from an unabsorbing indexed matched material.

9. The solid state saturable absorber as recited in claim 8, wherein said material is undoped YAG.

10. The solid state saturable absorber as recited in claim 1, wherein said cooling means includes a conduction cooling system.

11. The solid state saturable absorber as recited in claim 1, wherein said cooling means includes a convection cooling system.

12. The solid state saturable absorber as recited in claim 2, wherein said pumping means includes means for end pumping said slab.

13. A solid state saturable absorber comprising:
- a plurality of generally rectangular thin cells of a solid state absorbing material, disposed generally parallel and spaced apart from one another forming a stack,
- a pair of end caps disposed such that said plurality of thin cells are sandwiched therebetween and spaced therefrom;
- a pair of side walls disposed generally perpendicular to the plains of said cells;
- mean for cooling said solid state absorbing material to thereby reduce the heat within said absorbing material.

14. The solid state saturable absorber as recited in claim 13 further including means for cooling said plurality of thin cells.

15. The solid state saturable absorber as recited in claim 14, wherein said thin cells of solid state material are formed from $CR^{4+}$:YAG.

16. The solid state saturable absorber as recited in claim 14, wherein said end caps are formed from an unabsorbing index matched material.

17. The solid state saturable absorber as recited in claim 16, wherein said material is undoped YAG.

18. The solid state saturable absorber as recited in claim 14, wherein said device is configured to receive a laser beam at an angle generally perpendicular to the plane of the thin cells.

19. The solid state saturable absorber as recited in claim 13 further including means for optically pumping said thin cells.

20. The solid state saturable absorber as recited in claim 19, wherein said cooling means includes a cooling channel formed between said sidewalls and said ends of said thin cells.

21. The solid state saturable absorber as recited in claim 20, wherein an index matched coolant is used in said cooling channel.

22. A solid state saturable absorber comprising:
- a plurality of generally rectangular thin cells of a solid state absorbing material parallel and spaced apart from one another forming a stack,
- a pair of sidewalls formed to the same general shape as said thin cells, said thin cells sandwiched between and spaced apart from said thin cells;
- a pair of end caps disposed adjacent opposing ends of said stack of thin cells, said end caps formed with an angled surface to cause light beams directed at said angled surfaced to be internally reflected through said stack in a zig-zag pattern; and
- means for cooling said solid state absorbing material to thereby reduce the heat, within said absorbing material.

23. The solid state saturable absorber as recited in claim 22 further including means for cooling said thin cells.

24. The solid state saturable absorber as recited in claim 22 further including means for optically pumping said thin cells.

25. The solid state saturable absorber as recited in claim 22, wherein said thin cells are formed from $CR^{4+}$:YAG.

26. The solid state saturable absorber as recited in claim 22, said cooling means includes end caps being spaced away from said ends of said stack forming a cooling channel.

27. The solid state saturable absorber as recited in claim 26, wherein an index matched coolant is used in said cooling channel.

28. The solid state saturable absorber as recited in claim 22, wherein said end caps are formed from an unabsorbing index matched material.

29. The solid state saturable absorber as recited in claim 28, wherein said material is undoped YAG.

30. The solid state saturable absorber as recited in claim 22, wherein said sidewalls are formed from an unabsorbing index matched material.

31. The solid state saturable absorber as recited in claim 30, wherein said material is undoped YAG.

* * * * *